(12) United States Patent
Ghalili et al.

(10) Patent No.: US 9,981,886 B2
(45) Date of Patent: May 29, 2018

(54) FERTILIZER

(71) Applicant: Acupac Packaging, Inc., Mahwah, NJ (US)

(72) Inventors: Babak Ghalili, New York, NY (US); Michael J. Borja, Mahwah, NJ (US)

( * ) Notice: Subject to any disclaimer, the term of this patent is extended or adjusted under 35 U.S.C. 154(b) by 0 days. days.

(21) Appl. No.: 14/824,588

(22) Filed: Aug. 12, 2015

(65) Prior Publication Data

US 2016/0185679 A1 Jun. 30, 2016

Related U.S. Application Data

(60) Provisional application No. 62/036,443, filed on Aug. 12, 2014.

(51) Int. Cl.

| | | |
|---|---|---|
| *C05G 3/02* | (2006.01) | |
| *C05G 3/00* | (2006.01) | |
| *C05D 9/02* | (2006.01) | |
| *C05B 17/00* | (2006.01) | |
| *C05C 11/00* | (2006.01) | |
| *C05D 1/00* | (2006.01) | |
| *C05D 3/00* | (2006.01) | |
| *C05D 5/00* | (2006.01) | |
| *C05D 9/00* | (2006.01) | |

(52) U.S. Cl.
CPC ............. *C05G 3/02* (2013.01); *C05B 17/00* (2013.01); *C05C 11/00* (2013.01); *C05D 1/00* (2013.01); *C05D 3/00* (2013.01); *C05D 5/00* (2013.01); *C05D 9/00* (2013.01); *C05D 9/02* (2013.01); *C05G 3/00* (2013.01); *C05G 3/0094* (2013.01)

(58) Field of Classification Search
CPC .......... C05G 3/02; C05G 3/00; C05G 3/0094; C05B 17/00; C05D 1/00; C05D 3/00; C05D 5/00; C05D 9/00; C05D 9/02; C05C 11/00
See application file for complete search history.

(56) References Cited

U.S. PATENT DOCUMENTS

| | | | | |
|---|---|---|---|---|
| 3,245,776 | A * | 4/1966 | Rubin | C05D 9/02 521/124 |
| 5,228,895 | A * | 7/1993 | Kelly | C05D 3/02 23/313 R |
| 2010/0008985 | A1* | 1/2010 | Pellikaan | A61K 9/2077 424/464 |
| 2013/0123103 | A1* | 5/2013 | Anderson | C05G 3/0082 504/102 |
| 2013/0251824 | A1* | 9/2013 | Hospodor | A61K 36/185 424/725 |
| 2014/0298511 | A1* | 10/2014 | Lewis | A61K 36/185 800/260 |
| 2014/0357708 | A1* | 12/2014 | Murty | A61K 31/352 514/454 |
| 2017/0197217 | A1* | 7/2017 | Bruggemann | A01F 11/00 |

OTHER PUBLICATIONS

Cappelletto, Pietro, et al. "Italy-grown hemp: yield, composition and cannabinoid content." Industrial Crops and Products 13.2 (2001): 101-113.*

* cited by examiner

*Primary Examiner* — Jennifer A Smith
(74) *Attorney, Agent, or Firm* — Ziegler IP Law Group, LLC

(57) ABSTRACT

The present invention is directed to a fertilizer composition comprising a cannabidiol (CBD Oil), and/or a tetrahydrocannabinol (THC Oil) and/or hemp oil derivatives in combination with a superabsorbent polymer(s) (SAP's). The present invention also relates to methods of using and manufacturing said fertilizers.

14 Claims, No Drawings

FERTILIZER

FIELD

The present invention is directed to a fertilizer composition comprising a cannabidiol (CBD Oil), and/or a tetrahydrocannabinol (THC Oil) and/or hemp oil derivatives in combination with a superabsorbent polymer(s) (SAP's). The present invention also relates to methods of using and manufacturing said fertilizers.

BACKGROUND OF THE INVENTION

Fertilizer generally refers to any material of natural or synthetic origin that may be applied to soils or plants supplying or modulating the uptake of one or more plant nutrients (including water) essential to the growth of plants. Numerous fertilizers are commercially available that provide nutrients necessary for plant growth including: the primary macronutrients nitrogen (N), phosphorus (P), potassium (K); the secondary macronutrients calcium (Ca), sulfur (S), magnesium (Mg); and the micronutrients or trace minerals boron (B), chlorine (Cl), manganese (Mn), iron (Fe), zinc (Zn), copper (Cu), molybdenum (Mo), selenium (Se). Most fertilizers are inorganic materials that are made by manufacturing procedures and supply nutrients that are taken up by the plants. As the organic food industry has advanced there is increased desire to find fertilizer compositions that are prepared from organic sources.

The fertilizers of the present invention possess novel properties including the ability to sequester moisture for the plant during prolonged dry periods. Certain fertilizer formulations also possess antimicrobial activity as well as modulating the absorption or bioavailabilty of plant nutrients and enhance the growth and/or nutrient quality of the plant. Field yield is enhanced through the use of the present fertilizers.

SUMMARY

The present invention is directed to a fertilizer composition comprising: Cannabidiol and a superabsorbent polymer (SAP).

Cannabidiol (CBD) is one of at least 60 cannabinoids identified in hemp plants. Hemp generally refers to the plant *cannabis sativa* certain varieties of which produce an extract known as tetrahydrocannabinol (THC). Certain hemp plants have been selected to produce one or more cannabinoids without producing THC. The present invention is primarily directed to the use of CBD which is a major phytocannabinoid, accounting for up to 40% of a high producing plant extract. CBD has the general molecular formula

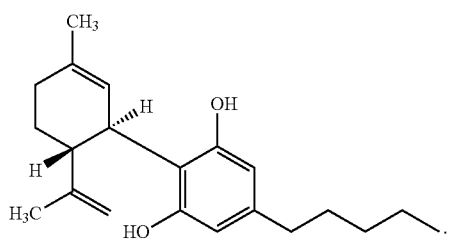 [SMILES: C=C(C)[C@@H]1CCC(C)=C[C@H]1c1c(O)cc(CCCCC)cc1O]

Cannabidiol is insoluble in water but soluble in organic solvents, such as pentane. At room temperature it is a colorless crystalline solid. In strongly basic medium and the presence of air it is oxidized to a quinone. Under acidic conditions it cyclizes to THC. The synthesis of cannabidiol has been accomplished by several research groups. Preferred formulations include less than 20% CBD. More preferred formulations include 0.01 to 10% CBD, more preferably 0.01 to 5% CBD and most preferably 0.01 to 0.20% CBD.

Superabsorbent polymers (SAP) are polymers that can absorb and retain extremely large amounts of a liquid, preferably water, relative to their own mass. Superabsorbent polymers (SAP's) include sodium carboxymethylcellulose, polyacrylamides, pectin, polyacrylic acid, polymethylvinylether maleic acid, sodium alginate, sodium/calcium alginate, polylactic acid, chitosan, carageenan, xanthan, gum Arabic, tragacanth gellan, polyaspartic acid, xanthan, guar, polyglutamic acid, hyaluronic acid or salts or derivatives thereof. Most preferred is sodium carboxymethylcellulose (CMC).

Preferably the SAP is 0.1-30% by weight of the formulation, more preferably 0.1-20%, more preferably 0.1-10%, more preferably 0.1-5%.

DETAILED DESCRIPTION

These and other aspects and advantages of the exemplary embodiments will become apparent from the following detailed description considered in conjunction with the general skill in the art. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

One aspect of the present invention relates to a fertilizer comprising: Cannabidiol, a superabsorbent polymer and a Base fertilizer composition.

A Base fertilizer composition can include singly or a combination of the following:
a. Macronutrients: nitrogen compounds, phosphorous compounds, potassium compounds, calcium compounds, magnesium compounds, and sulfur compounds.
b. Micronutrient compounds of: boron, chlorine, copper, iron, manganese, molybdenum, zinc and nickel.

Base fertilizers are commonly described according to nitrogen, phosphate and potassium concentrations (so called N-P-K formulations). One preferred N-P-K fertilizer formulation is 3-2-2. Another preferred N-P-K fertilizer formulation is 10-10-10.

Another aspect comprises a formulation of CBD, THC, and other hemp oil derivatives.

Another aspect relates to the use of the formulations for spurring growth and strength of plant species.

Another aspect relates to the use of the formulations for controlling pest such as insects (such as caterpillars, hornworms, moths, cabbageworms, pickleworms, corn earworms, whitefly, aphids, mealybugs, scale, spider mites, thrips, leafminer, beetles, curculio, fleas, rootworms, weevils and loopers), grubs, cutworms, root maggots, wire worms, ants, earwigs, nematodes, slugs and snails.

Another aspect relates to the use of the formulations for controlling mildew, fungus, and viruses.

Another aspect relates to the use of concentrated formulations that can be easily diluted by the end user before use.

Another aspect comprises a formulation (w/w): 0.1-99.5% base fertilizer, 0.1-20% NaCMC, and 0.01-20% CBD oil.

Another aspect comprises a formulation (w/w): 50-99.0% base fertilizer, 0.5-10% NaCMC, and 0.10-10% CBD oil.

Another aspect comprises a formulation (w/w): 80-98.0% base fertilizer, 1.0-5.0% NaCMC, and 0.01 to 0.20% CBD oil.

Another aspect comprises a slow release fertilizer formulation wherein the active agents (including Nitrogen, phosphate and potassium sources as well as Cannabidiol and SAP) are slowly released over a period of weeks or months.

Sustained release fertilizer may comprise pellets with coating layer selected from the group consisting of polyurethanes, epoxies, polyacrylates, polyvinyldene chloride, sulfur, polyvinyl chlorides (PVC) and combinations thereof. Other controlled release fertilizer coatings include the processes of sulfur coating urea particles (e.g., U.S. Pat. Nos. 3,295,950, 5,300,135), 4,711,699, 4,969,947, and epoxy coating fertilizer compositions (e.g., U.S. Pat. Nos. 3,264,088 and 5,698,002).

Another aspect comprises an immediate release fertilizer formulation wherein the active agents (including Nitrogen, phosphate and potassium sources as well as Cannabidiol and SAP) are released over a short period (days).

Fertilizer may be formulated as a solid such as granular or powder or in liquid form.

While there have been shown, described and pointed out, fundamental novel features of the invention as applied to the exemplary aspects thereof, it will be understood that various omissions and substitutions and changes in the form and details of devices and methods illustrated, and in their operation, may be made by those skilled in the art without departing from the spirit or scope of the invention. Moreover, it is expressly intended that all combinations of those elements and/or method steps, which perform substantially the same function in substantially the same way to achieve the same results, are within the scope of the invention. Moreover, it should be recognized that structures and/or elements and/or method steps shown and/or described in connection with any disclosed form or aspect of the invention may be incorporated in any other disclosed or described or suggested form or aspect as a general matter of design choice. It is the intention, therefore, to be limited only as indicated by the scope of the claims appended hereto.

The invention claimed is:

1. A CBD oil slow release fertilizer composition comprising:
   a. 80-98.0% base fertilizer comprising:
      i. macronutrients selected from the group consisting of nitrogen compounds, phosphorous compounds, potassium compounds, calcium compounds, magnesium compounds, and sulfur compounds; and
      ii. micronutrient compounds selected from the group consisting of boron, chlorine, copper, iron, manganese, molybdenum, zinc and nickel;
   b. 1.0-5.0% NaCMC;
   c. 0.01-0.20% CBD oil; and
   d. a coating layer capable of providing a slow release of the CBD oil.

2. A fertilizer composition according to claim 1, wherein said fertilizer composition has a N-P-K fertilizer formulation ratio of 10-10-10.

3. A fertilizer composition according to claim 1, wherein said fertilizer composition has a N-P-K fertilizer formulation ratio of 3-2-2.

4. A fertilizer composition according to claim 1, wherein said coating layer is selected from the group consisting of polyurethanes, epoxies, polyacrylates, polyvinyldene chloride, sulfur, polyvinyl chlorides (PVC) and combinations thereof.

5. A fertilizer composition according to claim 1, wherein said NaCMC is capable of absorbing and retaining a liquid.

6. A fertilizer composition according to claim 1, wherein the coating material is capable of slowly releasing the CBD oil over a period of weeks.

7. A fertilizer composition according to claim 1, wherein the coating material is capable of slowly releasing the CBD oil over a period of months.

8. A method of using a slow release CBD fertilizer composition for a plant comprising:
   a. administering to said plant a fertilizer composition including:
      1. 80-98.0% base fertilizer comprising:
         i. macronutrients selected from the group consisting of nitrogen compounds, phosphorous compounds, potassium compounds, calcium compounds, magnesium compounds, and sulfur compounds; and
         ii. micronutrient compounds selected from the group consisting of boron, chlorine, copper, iron, manganese, molybdenum, zinc and nickel;
      2. 1.0-5.0% NaCMC;
      3. 0.01-0.20% CBD oil; and
      4. a coating layer capable of providing a slow release of the CBD oil; and
   b. slowly releasing the CBD oil.

9. A method according to claim 8, wherein said fertilizer composition has a N-P-K fertilizer formulation ratio of 10-10-10.

10. A method according to claim 8, wherein said fertilizer composition has a N-P-K fertilizer formulation ratio of 3-2-2.

11. A method according to claim 8, wherein said coating layer is selected from the group consisting of polyurethanes, epoxies, polyacrylates, polyvinyldene chloride, sulfur, polyvinyl chlorides (PVC) and combinations thereof.

12. A method according to claim 8, wherein said NaCMC is capable of absorbing and retaining a liquid.

13. A method according to claim 8, further comprising slowly releasing the CBD oil over a period of weeks.

14. A method according to claim 8, further comprising slowly releasing the CBD oil over a period of months.

* * * * *